US012706269B2

(12) United States Patent
Freudenberger et al.

(10) Patent No.: US 12,706,269 B2
(45) Date of Patent: Aug. 11, 2026

(54) FIELD EFFECT ELECTRON EMITTER WITH GROUPED PART EMISSION SURFACES

(71) Applicant: Siemens Healthineers AG, Forchheim (DE)

(72) Inventors: Joerg Freudenberger, Kalchreuth (DE); Michael Wimmer, Weisendorf (DE); Anja Fritzler, Erlangen (DE); Christoph Jud, Nuremberg (DE); Peter Geithner, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 197 days.

(21) Appl. No.: 18/585,720

(22) Filed: Feb. 23, 2024

(65) Prior Publication Data

US 2024/0290567 A1 Aug. 29, 2024

(30) Foreign Application Priority Data

Feb. 28, 2023 (EP) .................................... 23159049

(51) Int. Cl.
*H01J 35/06* (2006.01)
*H01J 35/14* (2006.01)

(52) U.S. Cl.
CPC .......... *H01J 35/065* (2013.01); *H01J 35/147* (2019.05)

(58) Field of Classification Search
CPC ........ H01J 35/065; H01J 35/147; H05G 1/30; H05G 1/58
See application file for complete search history.

(56) References Cited

U.S. PATENT DOCUMENTS

2013/0294580 A1* 11/2013 Tsujii .................... A61B 6/542 378/62
2021/0385930 A1 12/2021 GmbH

FOREIGN PATENT DOCUMENTS

| | | | |
|---|---|---|---|
| DE | 202021104081 | U1 | 8/2021 |
| DE | 102020206938 | A1 | 12/2021 |
| EP | 2082412 | A2 | 7/2009 |
| EP | 3748667 | A1 | 12/2020 |
| WO | WO 2008044196 | A2 | 4/2008 |
| WO | WO 2013136299 | A1 | 9/2013 |

OTHER PUBLICATIONS

International Standard: IEC 60336—Third edition "X-ray tube assemblies for medical diagnosis—Characteristics of focal spots", Aug. 1993.

* cited by examiner

*Primary Examiner* — David J Makiya
*Assistant Examiner* — Miya Downing
(74) *Attorney, Agent, or Firm* — Harness, Dickey & Pierce, P.L.C.

(57) ABSTRACT

A field effect electron emitter comprises a segmented emission surface and a control unit. The segmented emission surface has a plurality of field effect emitter needles and a number of segments, each segment having an activatable part emission surface, wherein the plurality of field effect emitter needles are distributed on the activatable part emission surfaces. The control unit is configured to activate various groups with at least one of the number of segments for a simultaneous electron emission from respective activatable part emission surfaces such that coherent and grouped part emission surfaces able to be activated in succession overlap in pairs by at least 25%.

19 Claims, 2 Drawing Sheets

FIELD EFFECT ELECTRON EMITTER WITH GROUPED PART EMISSION SURFACES

CROSS-REFERENCE TO RELATED APPLICATION(S)

The present application claims priority under 35 U.S.C. § 119 to European Patent Application No. 23159049.8, filed Feb. 28, 2023, the entire contents of which is incorporated herein by reference.

FIELD

One or more example embodiments of the present invention relate to a field effect electron emitter and to an x-ray tube.

BACKGROUND

A conventional x-ray tube, in particular for a medical application, can typically create a number of focal spots with a different dimension and/or different position. The focal spot arises in particular through an interaction between accelerated electrons arriving at the anode, wherein around 99% of the kinetic energy of the electrons is converted into lost heat. The remaining portion typically creates the x-rays. When the anode is mounted rotatably the focal spot is typically part of a ring-shaped focal track.

The dimension of the focal spot on an anode correlates in particular with the resolution of the x-ray radiation. The higher the resolution is, the more details can advantageously be distinguished with the x-ray radiation. Since the energy able to be deposited within the dimension of the focal spot is limited, the focal spot cannot be embodied in the form of a point, because in this case either the generated x-ray dose is too low or, with a sufficient x-ray dose, the thermal load in the focal spot is too high. Accordingly, depending on application of the x-ray radiation, the dimension of the focal spot varies regularly.

The focal spot dimensions are typically specified in a so-called focal spot class according to IEC standard 60336. Typically the conventional x-ray tube has two to three different focal spots in graduated dimensions, for example IEC 0.6 and 1.2 or IEC 0.4, 0.6, 1.0.

In such cases the focal spot class correlates in particular to the focal spot dimension. Typically the focal spot dimension of a specific focal spot class obtained at the anode might typically lies within a tolerance range.

The position of the focal spot can be changed in specific applications of the x-ray radiation. In such a case the application comprises a so-called jump focus, when the focal spot jumps backwards and forwards between a number of positions, for example between 2 times 2 positions in a plane. The positions typically lie displaced from one another by 50% of a length and/or width of the focal spot dimension. A jump focus application is typically only used for the smaller focal spots of the conventional x-ray tube, since the resolution of the x-ray radiation in particular can be increased by the jump focus.

Typical advantages with the use of field effect electron emitters are in particular a cold emission by contrast with a thermionic emitter or with a dispenser cathode. Typically the electron emission in a field effect electron emitter is able to be switched quickly, which in particular makes possible a grid blockage or a grid pulsing. A further advantage relates to a non-inertial control of the emitted electron current, which is also called the tube current. A field effect electron emitter can regularly be used via a pulse width modulation for modulation of the x-ray radiation dose.

It is furthermore known, via especially powerful field effect electron emitters, to map emitted electrons directly, meaning without deflection or focusing, by an electrostatic or electromagnetic deflection unit, onto an anode. In this case a field designed for acceleration of the emitted electrons, for example the acceleration voltage or a radio frequency wave, preferably prevails exclusively between the anode and the field effect electron emitter. Such especially powerful field effect electron emitters advantageously have a pixelated emission surface, whereby preferably an emission surface dimension, an emission surface shape and/or an emission surface content and thus the focal spot dimension, a focal spot shape and/or the focal spot position is freely selectable. The pixelated emission surface is known for example from EP 3 748 667 A1 or from WO 2013/136 299 A1 and an asymmetrical focal spot shape for lowering the load on the anode is known from WO 2008/044 196 A2.

EP 3 748 667 A1 relates to an x-ray tube, having an anode, a first switching apparatus, a second switching apparatus, a control unit and an emitter with a number of field effect emitter needles, wherein at least one field effect emitter needle of the number of field effect emitter needles features a diameter of less than 1 μm and silicon, wherein a first group of the number of field effect emitter needles is able to be switched on or switched off via the first switching apparatus, wherein a second group of the number of field effect emitter needles is able to be switched on or switched off via the second switching apparatus, wherein the first group differs from the second group and wherein the control unit is embodied to activate the first switching apparatus and the second switching apparatus.

SUMMARY

At least one underlying object of embodiments of the present invention is to specify a field effect electron emitter and an x-ray tube in which the focal spot dimension, the focal spot shape and/or the focal spot position on the anode can be established as easily as possible.

At least this object is achieved by the features of the independent claims. Advantageous embodiments are described in the dependent claims.

Independent of the grammatical term usage, individuals with male, female or other gender identities are included within the term.

The inventive field effect electron emitter has a segmented emission surface, wherein the emission surface has a plurality of field effect emitter needles and a number of segments, each with an activatable part emission surface, wherein the plurality of field effect emitter needles is distributed over the part emission surfaces, and a control unit, which is configured to activate various groups with at least one of the number of segments in such a way for a simultaneous electron emission from the respective part emission surfaces that the coherent and grouped part emission surfaces, able to be activated after one another, overlap in pairs by at least 25%.

In accordance with one form of embodiment the number of segments amounts to nine.

In accordance with one form of embodiment the control unit is configured to activate five different grouped part emission surfaces in such a way that four grouped part emission surfaces have an identical emission surface dimension smaller than the maximum emission surface dimension and one grouped part emission surface has the maximum emission surface dimension.

In accordance with one form of embodiment the number of segments amounts to ten or eleven.

In accordance with one form of embodiment the control unit is configured to activate six different grouped part emission surfaces in such a way that four grouped part emission surfaces have an identical emission surface dimension smaller than the maximum emission surface dimension, one grouped part emission surface has the maximum emission surface dimension and a further grouped part emission surface has an emission surface dimension smaller than the maximum emission surface dimension and larger than the emission surface dimension of the four grouped part emission surfaces.

In accordance with one form of embodiment the control unit is configured to vary an emitted electron stream per segment for each grouped part emission surface for a simultaneous asymmetrical electron emission.

In accordance with one form of embodiment the grouped part emission surfaces overlap by at least 50%.

In accordance with one form of embodiment one segment of the number of segments has a L shape, wherein the L-shaped segment adjoins two sides of another segment of the number of segments with its limbs.

In accordance with one form of embodiment the L-shaped segment is embodied in such a way that the L-shaped adjoins sides of at least three different segments of the number of segments with its limbs.

In accordance with one form of embodiment the emission surface is pixelated in two spatial directions.

In accordance with one form of embodiment exactly one switching apparatus is assigned to each segment.

The inventive x-ray tube has

- a field effect electron emitter,
- an anode for generation of x-ray radiation depending on electrons that arrive at it and
- an evacuated housing, wherein the field effect electron emitter and the anode are arranged within the evacuated housing.

In accordance with one form of embodiment a field applied exclusively for acceleration of the emitted electrons prevails between the anode and the field effect electron emitter.

In accordance with one form of embodiment the control unit of the field effect electron emitter is configured, through the alternating activation of at least two grouped part emission surfaces with identical emission surface dimension, to allow a focal spot jump onto the anode.

In accordance with one form of embodiment the control unit of the field effect electron emitter is configured, through the alternating activation of at least two grouped part emission surfaces with different emission surface dimension, to change the size of a focal spot on the anode.

Example advantages of the inventive field effect electron emitter and the x-ray tube are in particular that comparatively few coherent and grouped part emission surfaces are sufficient to allow the focal spot to jump onto the anode and/or to change the size of the focal spot on the anode. In accordance with embodiments of the present invention, this is achieved by the coherent and grouped part emission surfaces, able to be activated one after the other, overlapping in pairs by at least 25%. If for example the focal spot jumps in a spatial direction by 50% of the focal spot dimension, then two IEC focal spot classes with a difference of approximately 1.5 can be obtained. Advantageously the 25% overlap thus makes possible the jump focus and/or various focal spot dimensions, for which substantially fewer switchable surfaces and thereby fewer switching apparatuses are needed. This in particular simplifies a structure of the control unit of the field effect electron emitter. A further advantage could be a more compact design of the field effect electron emitter, since the control unit can have a simpler layout.

BRIEF DESCRIPTION OF THE DRAWINGS

The present invention will be described and explained below in greater detail with the aid of the exemplary embodiments shown in the figures. Basically, in the description of the figures given below, structures and units that essentially remain the same and have the same reference numbers are labeled as they are the first time that the respective structure or unit occurs.

In the figures.

DETAILED DESCRIPTION

Figure 1:
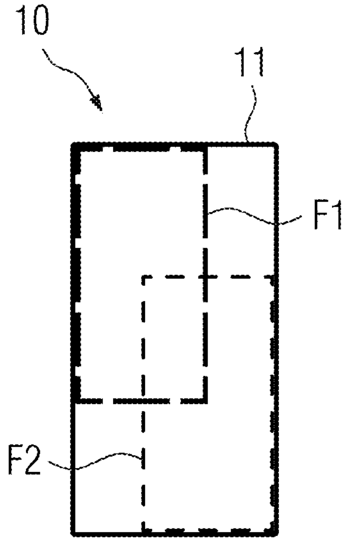
FIG. 1 shows an inventive field effect electron emitter.

FIG. 1 shows a view from above of an inventive field effect electron emitter 10.

The field effect electron emitter 10 has a segmented emission surface 11 and a control unit not shown in FIG. 1. The emission surface 11 has a plurality of field effect emitter needles and a number of segments each with an activatable part emission surface. The plurality of field effect emitter needles is distributed over the part emission surfaces.

The number of segments and thus the part emission surfaces are rectangular in this exemplary embodiment. It is conceivable for the segments to have a round shape or a shape with more or less corners than shown in FIG. 1.

The segmented emission surface 11 is divided into a number of segments. Typically all field effect emitter needles within one segment can be activated or deactivated jointly. In other words the field effect emitter needles of each segment are in particular switched together.

The activatable part emission surface of a segment usually has all field effect emitter needles of this segment. An activatable part emission surface can consist of those field effect emitter needles of a segment. All field effect emitter needles of a segment can form the activatable part emission surface.

The field effect emitter needles of each segment are in particular coherent. An envelope of the field effect emitter needles of each segment, wherein the envelope runs along the side of the segment, in particular does not comprise any single field effect emitter needles of another segment.

The plurality of field effect emitter needles is preferably distributed evenly over the part emission surfaces. With an even distribution the part emission surfaces typically have an essentially equal number of field effect emitter needles per unit of surface. In other words a field effect emitter needle density typically does not vary across the part emission surface and/or the segmented emission surface 11 but is constant. This can mean in particular that the segmented emission surface 11 comprises evenly distributed field effect emitter needles.

The fact that the plurality of field effect emitter needles is distributed on the part emission surfaces means in particular that the field effect emitter needles of all segments can be equal to the plurality of field effect emitter needles. In other words each segment usually has a subset greater than zero and less than 100% of the plurality of field effect emitter needles.

The plurality of field effect emitter needles is usually arranged on a substrate. The substrate and/or the field effect emitter needles can in particular feature silicon, carbon or molybdenum. The field effect emitter needles usually have a diameter in the micro or nanometer range. The plurality of field effect emitter needles in particular comprises more than 100, preferably more than 10000, especially advantageously more than 1000000 field effect emitter needles. The field effect emitter needles can in particular have a semiconductor structure and/or a transistor connected upstream from them in order to limit the outflow of current via the field effect emitter needle.

The field effect electron emitter 10 can be configured in particular for a direct mapping of the emitted electrons onto the focal spot. In this case an emission surface dimension of a grouped part emission surface corresponds in particular 1 to 1 to a focal spot dimension on an anode.

The control unit is configured to activate various groups with at least one of the number of segments in such a way for a simultaneous electron emission from the respective part emission surfaces that the coherent and grouped part emission surfaces F1, F2, activatable one after another, overlap in pairs by at least 25%.

The activatable part emission surface of a segment can typically be activated or deactivated via the control unit. The respective part emission surface is typically not activated continuously, but for a restricted period of time. The part emission surface can in particular be activated and/or deactivated multiple times in succession. In particular it is conceivable for a period of time in which the part emission surface is activated or deactivated to be short enough for the part emission surface to be able to emit the electrons in a pulsed mode.

An activation of the part emission surface generally comprises an increase in the flow of electrons generated via the field effect emitter needles arranged in this activated part emission surface. The flow of electrons in particular comprises those free electrons that are generated at the field effect emitter needle tips via the field effect. The increase in the flow of electrons can take place relative to a flow of electrons of zero or of greater than zero. In other words the activation of the part emission surface can comprise the switching on of the flow of electrons or the increase in the flow of electrons.

A deactivation of the part emission surface generally comprises a reduction in the flow of electrons generated via the field effect emitter needles arranged in this deactivated part emission surface. The reduction of the flow of electrons takes place in particular to a flow of electrons or zero or of greater than zero. In other words the deactivation of the part emission surface can comprise the switching off of the flow of electrons or the reduction in the flow of electrons.

An activated part emission surface in any event typically emits electrons and/or causes an electron emission. A deactivated part emission surface can basically also emit electrons thus cause an electron emission, in this case however at least with a lower flow of electrons than previously.

The activation or the deactivation of the part emission surface corresponds in particular to a regulation of a flow of electrons generated in the respective part emission surface and/or takes place in particular by a regulation of the gate voltage, which can trigger the field effect at the field effect emitter needle tips to generate free electrons. The gate voltage can be applied for example for all field effect emitter needles per segment separately, in groups or just jointly. In the latter case exactly one switching apparatus, which regulates the gate voltage for all field effect emitter needles of this segment jointly, can be assigned to each segment. The assignment comprises in particular the setting up of the switching apparatus as a switch for the respective segment.

The electron emission from the part emission surfaces can occur simultaneously, in particular at the same time. In other words more than one part emission surface and/or the entire emission surface can be activated at the same time. These activated part emission surfaces are the grouped part emission surfaces F1, F2, F3, F4, F5, F6. In other words those part emission surfaces that are activated form the grouped part emission surfaces. Grouped in this context in particular means switched together and activated at the same time. The grouped part emission surfaces can be referred to in particular as focal spot-generating part emission surfaces.

The control unit can comprise a logic module. As an alternative or in addition the control unit can have a circuit arrangement comprising a low-resistance supply line and/or a resistor and/or a diode and/or a capacitor and/or a transistor. In the circuit arrangement for example the various groups and thus the respective segments of the groups are permanently connected to one another. Typically the control unit comprises at least one switching apparatus for each segment. The switching of the switching apparatus for example enables the gate voltage to be regulated at the respective part emission surface. In an advantageous form of embodiment the control unit comprises exactly one switching apparatus per segment and thus a maximum of one switching apparatus per segment. This enables the structure of the control unit of the field effect electron emitter to be simplified.

The activation of a group comprises in particular the activation of the part emission surfaces of this group for the electron emission. The groups can comprise an individual segment of the number of segments, more than one segment of the number of segments or all segments. Usually the groups differ in a number of the segments and/or in the respective segments that they comprise. It is conceivable for the groups in the control unit to be able to be changed at least in part in respect of the number of the segments and/or the respective segments comprised, by the adaptation of program code, for example.

An activated group causes an electron emission in the respective part emission surfaces comprised. When the activated group comprises more than one part emission surface, then the activated group comprises the electron emission in the respectively comprised part emission surfaces simultaneously, in particular at the same time.

The control unit is in particular configured to activate various groups over the time. Each group comprises in particular at least one part emission surface, which is able to be activated in turn. The control unit can in particular activate the various groups according to a defined sequence. The sequence can make provision that, at a first point in time, a first group, and at a second point in time after the first point in time, a second group is activated. The sequence can be defined in a protocol, in particular in an emission protocol and/or in an imaging protocol.

The control unit can in particular activate the respective group in such a way that the activated part emission surfaces of this respective group are coherent. The fact that the activated part emission surfaces are coherent means in particular that with a number of segments in a group, these segments adjoin each other in a planar manner in particular on one segment side and/or that an envelope along the segment sides of the segments of this group does not comprise a segment of another group. In other words coherent part emission surfaces of a group are not interrupted by a segment that is not part of this group. An outer shape of the coherent part emission surfaces and/or the envelope of the coherent part emission surfaces can in particular be round or angular. The coherent and grouped part emission surfaces correspond in particular to a focal spot dimension.

The control unit is in particular configured to activate the various groups so that the part emission surfaces F1, F2, F3, F4, F5, F6 activatable after one another and/or activated overlap in pairs by at least 25%. In this case an intersection consisting of a grouped part emission surface with another grouped part emission surface is not equal to zero. The intersection in particular forms a segment with a part emission surface, which is part of the one grouped part emission surface and part of the other grouped part emission surface. The part emission surface of the intersection comprises in particular 25% of the part emission surface of the one grouped part emission surface and of the other grouped part emission surface.

Figure 2:
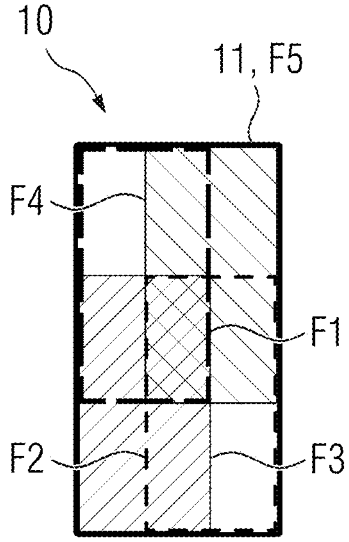
FIG. 2 shows a first exemplary embodiment of the field effect electron emitter.

FIG. 2 shows a view from above of a first exemplary embodiment of the field effect electron emitter 10.

The number of segments amounts to nine. The control unit is configured to activate five different grouped part emission surfaces in such a way that four grouped part emission surfaces F1, F2, F3, F4 have an identical emission surface dimension smaller than the maximum emission surface dimension and one grouped part emission surface F5 has the maximum emission surface dimension. The four grouped part emission surfaces F1, F2, F3, F4 and the grouped part emission surface F5 differ in particular in a focal spot dimension due to the various emission surface dimensions. The four grouped part emission surfaces F1, F2, F3, F4 have the same emission surface dimension and thus create essentially the same focal spot dimension. The four grouped part emission surfaces F1, F2, F3, F4 have an offset of 50% relative to one another in at least one spatial direction and are in particular suitable for making the focal spot jump onto the anode.

Figure 3:
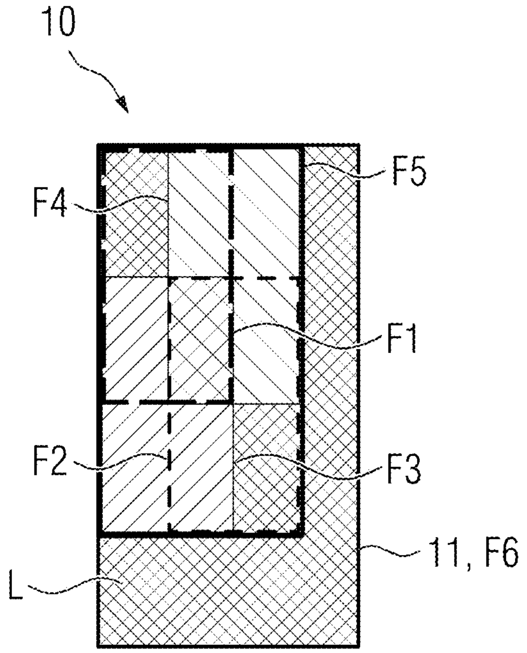
FIG. 3 shows a second exemplary embodiment of the field effect electron emitter.

FIG. 3 shows a view from above of a second exemplary embodiment of the field effect electron emitter 10.

The number of segments amounts to ten. The control unit is configured to activate six different grouped part emission surfaces in such a way that four grouped part emission surfaces F1, F2, F3, F4 have an identical emission surface dimension smaller than the maximum emission surface dimension, a grouped part emission surface F6 has the maximum emission surface dimension and a further grouped part emission surface F5 has an emission surface dimension smaller than the maximum emission surface dimension and larger than the emission surface dimension of the four grouped part emission surfaces F1, F2, F3, F4. The four grouped part emission surfaces F1, F2, F3, F4, the grouped part emission surface F6 and the further grouped part emission surface F5 differ in particular in a focal spot dimension due to the various emission surface dimensions. The four grouped part emission surfaces F1, F2, F3, F4 have the same emission surface dimension and thus essentially create the same focal spot dimension. The four grouped part emission surfaces F1, F2, F3, F4 have an offset in relation to one another of 50% in at least one spatial direction and are in particular suitable for making the focal spot jump onto the anode.

In this form of embodiment a segment L of the number of segments advantageously has an L shape. The L-shaped segment L adjoins two sides of another segment of the number of segments with its limbs. The L-shaped segment L is embodied in such a way that the L-shaped segment L adjoins sides of at least three different segments of the number of segments with its limbs. In an advantageous development the L-shaped segment is assigned exactly one switching apparatus. In this case the part emission surfaces of the L-shaped segment L can preferably only be activated together and only need the exactly one switching apparatus for this. The structure of the control unit is advantageously simplified by this.

Not shown in FIG. 3 is the variant in which the number of the segments amounts to eleven. In this case the L-shaped segment L could in particular be divided into two segments, wherein one is still L-shaped in particular and another is an outermost part of a limb of the L-shaped segment L. In this regard it is also conceivable for the L-shaped segment L to be divided into more than two segments, wherein the number of segments can be increased accordingly.

When the number of segments amounts to eleven, because in particular the outermost part of the limb of the L-shaped segment is separated, the control unit can preferably be configured to activate various grouped part emission surfaces in such a way that the grouped part emission surfaces have essentially the same emission surface content and differ in the shape of the emission surface. With reference to the variant shown in FIG. 3 this form of embodiment not shown will be briefly explained below. Here the grouped part emission surfaces F1, F2, F3, F4 likewise have the same emission surface content. With a corresponding embodiment of the eleventh segment the same emission surface content could be activated when the eleventh segment is separated in rows with the other segments. In other words the control unit can be configured to activate one row and/or one column of the segmented emission surface. The row of segments in this case forms a grouped emission surface, which has essentially the same emission surface content and differs in shape of the emission surface compared to the shape of the emission surface of the grouped part emission surfaces F1, F2, F3, F4. The term essentially the same can imply that the respective segments have a comparable, but for example not identical, number of field effect emitter needles and/or a comparable, but for example not identical, emission surface shape.

Figure 4:
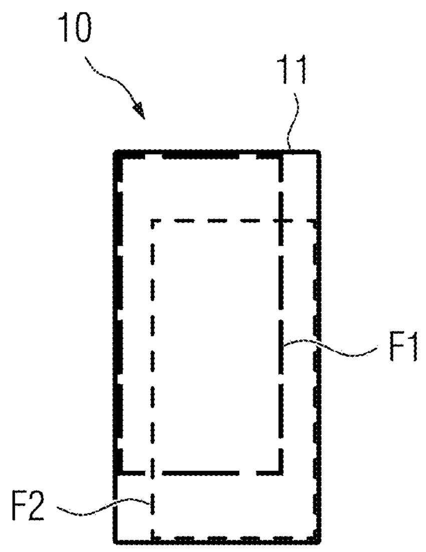
FIG. 4 shows a third exemplary embodiment of the field effect electron emitter.

FIG. 4 shows a view from above of a third exemplary embodiment of the field effect electron emitter 10, using the exemplary embodiment of FIG. 1 as its starting point. The grouped part emission surfaces F1, F2 overlap in this exemplary embodiment by at least 50%.

Figure 5:
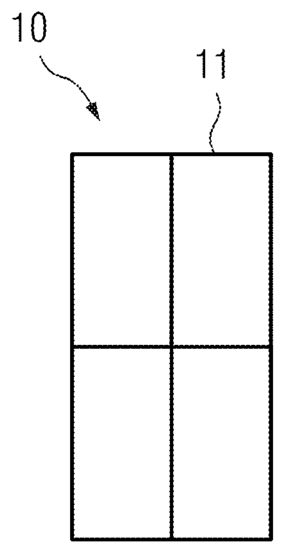
FIG. 5 shows a fourth exemplary embodiment of the field effect electron emitter and FIG. 6 shows an inventive x-ray tube.

FIG. 5 shows a view from above of a fourth exemplary embodiment of the field effect electron emitter 10, using the exemplary embodiment of FIG. 1 as its starting point. The emission surface 11 is pixelated in two spatial directions. The number of pixels amounts to 2 times 2 and can correspond to the number of segments. The number of pixels can be greater than four.

The pixelated emission surface 11 essentially corresponds to a division of the emission surface 11 in a Cartesian manner. In this case at least one segment of the number of segments is rectangular, can in particular be square. An alternative is conceivable, wherein one segment of the number of segments has more than four corners, for example five or six. The shape of the segments can in particular be honeycomb, L, U, or C-shape. A circle segment shape or a round shape is also conceivable.

Independent of the number of segments shown in FIG. 5, the following development is also possible for another number. One form of embodiment makes provision for the control unit to be configured to vary an emitted flow of electrons per segment for each grouped part emission surface F1, F2, F3, F4, F5, F6 for a simultaneous asymmetrical electron emission. The asymmetry does not relate in this case to the shape of the emission surface. The asymmetry results from a variation of the electron emission per unit of surface. The variation of the electron emission is undertaken in particular by the flow of electrons generated by a field effect emitter needle being varied by comparison with a simultaneously emitted flow of electrons of another field effect emitter needle. As stated previously, the field effect emitter needles are typically distributed evenly, in particular within each segment. In this advantageous form of embodiment the electron emission per unit of surface also varies for example by all field effect emitter needles of one segment generating a higher flow of electrons than all field effect emitter needles of another segment. Thus the asymmetrical electron emission arises. It is conceivable for a number of segments to have an increased flow of electrons. The amplitude of the flow of electrons can be set in particular by the amplitude of the gate voltage.

Figure 6:
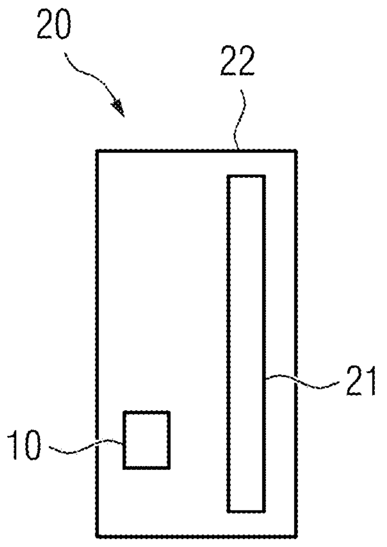

FIG. 6 shows an inventive x-ray tube 20 in a cross section.

The x-ray tube 20 has a field effect electron emitter 10, an anode 21 for generation of x-ray radiation depending on electrons arriving at it and an evacuated housing 22. The field effect electron emitter 10 and the anode 21 are arranged within the evacuated housing 22. With simultaneous electron emission from the respective activated part emission surfaces, the field effect electron emitter 10 in particular generates those electrons that arrive at the anode 21. The anode 21 can in particular be a rotating anode or a static anode. Basically it is conceivable for the x-ray tube to be embodied as a rotary piston x-ray tube, wherein the anode rotates together with the housing of the x-ray tube.

Advantageously a field applied for acceleration of the emitted electrons prevails exclusively between the anode 21 and the field effect electron emitter 10. In other words the x-ray tube 20 has no deflection unit for deflecting or focusing the emitted electrons. In this case an emission surface dimension of the field effect electron emitter 10 is typically mapped directly, meaning 1 to 1, onto the anode 21. Conventional deflection units create electrostatic and/or electromagnetic fields for deflection and/or focusing of the electrons, wherein in the inventive x-ray tube such conventional fields advantageously do not (cannot) overlay the field applied for acceleration of the emitted electrons. The field applied for acceleration can emanate from the acceleration voltage between the anode 21 and the field effect electron emitter 10 or from radio frequency waves created via a radio frequency source.

The x-ray radiation generated via the anode 21 can in particular be intended for a medical or industrial application. The medical application comprises in particular a diagnostic imaging, in particular a computed tomography, an angiography and/or a mammography. As an alternative or in addition the medical application can comprise a therapy. The industrial application comprises in particular materials testing.

Advantageously, the control unit of the field effect electron emitter 10 is configured, through the alternating activation of at least two grouped part emission surfaces F1, F2, F3, F4 with an identical emission surface dimension, to allow a focal spot to jump onto the anode 21 and/or through the alternating activation of at least two grouped part emission surfaces F1, F5, F6 with a different emission surface dimension, to change the size of a focal spot on the anode 21.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been illustrated and described in greater detail by the preferred exemplary embodiments, the present invention is not restricted by the disclosed examples and other variations can be derived herefrom by the person skilled in the art, without departing from the scope of protection of the present invention.

What is claimed is:

1. A field effect electron emitter, comprising:

a segmented emission surface, wherein the segmented emission surface has a plurality of field effect emitter needles and a number of segments, each segment having an activatable part emission surface, wherein the plurality of field effect emitter needles are distributed on the activatable part emission surfaces; and a control unit configured to activate various groups with at least one of the number of segments for a simultaneous electron emission from respective activatable part emission surfaces such that coherent and grouped part emission surfaces able to be activated in succession overlap in pairs by at least 25%, wherein the control unit is configured to vary an emitted flow of electrons per segment for each grouped part emission surface for a simultaneous asymmetrical electron emission such that all field effect emitter needles of a first segment generate a higher flow of electrons than all field effect emitter needles of a second segment.

2. The field effect electron emitter as claimed in claim 1, wherein the number of segments includes nine segments.

3. The field effect electron emitter as claimed in claim 2, wherein the control unit is configured to activate five different grouped part emission surfaces such that four grouped part emission surfaces have an identical emission surface dimension, which is smaller than a maximum emission surface dimension, and one grouped part emission surface has the maximum emission surface dimension.

4. The field effect electron emitter as claimed in claim 1, wherein the number of segments includes ten or eleven segments.

5. The field effect electron emitter as claimed in claim 4, wherein the control unit is configured to activate six different grouped part emission surfaces such that four grouped part emission surfaces have an identical emission surface dimension, which is smaller than a maximum emission surface dimension, one grouped part emission surface has the maximum emission surface dimension, and a further grouped part emission surface has an emission surface dimension smaller than the maximum emission surface dimension and larger than the emission surface dimension of the four grouped part emission surfaces.

6. The field effect electron emitter as claimed in claim 1, wherein the control unit is configured to activate various grouped part emission surfaces such that the grouped part emission surfaces have substantially a same emission surface content and differ in a shape of the emission surface.

7. The field effect electron emitter as claimed in claim 1, wherein grouped part emission surfaces overlap by at least 50%.

8. The field effect electron emitter as claimed in claim 1, wherein a segment, of the number of segments, is an L-shaped segment, and wherein limbs of the L-shaped segment adjoin two sides of another segment of the number of segments.

9. The field effect electron emitter as claimed in claim 8, wherein the L-shaped segment is configured such that the limbs of the L-shaped segment adjoin sides of at least three different segments of the number of segments.

10. The field effect electron emitter as claimed in claim 1, wherein exactly one switching apparatus is assigned to each segment of the number of segments.

11. An x-ray tube, comprising:

a field effect electron emitter as claimed in claim 1;

an anode configured to generate x-ray radiation based on impinging electrons; and an evacuated housing, wherein the field effect electron emitter and the anode are arranged within the evacuated housing.

12. The x-ray tube as claimed in claim 11, wherein a field applied for acceleration of emitted electrons prevails exclusively between the anode and the field effect electron emitter.

13. The x-ray tube as claimed in claim 11, wherein the control unit is configured, through alternating activation of at least two grouped part emission surfaces with identical emission surface dimensions, to allow a focal spot to jump onto the anode.

14. The x-ray tube as claimed in claim 11, wherein the control unit is configured, through alternating activation of at least two grouped part emission surfaces with different emission surface dimensions, to change a size of a focal spot on the anode.

15. The field effect electron emitter as claimed in claim 3, wherein the control unit is configured to activate various grouped part emission surfaces such that the grouped part emission surfaces have substantially a same emission surface content and differ in a shape of the emission surface.

16. The field effect electron emitter as claimed in claim 5, wherein the control unit is configured to activate various grouped part emission surfaces such that the grouped part emission surfaces have substantially a same emission surface content and differ in a shape of the emission surface.

17. The field effect electron emitter as claimed in claim 3, wherein the grouped part emission surfaces overlap by at least 50%.

18. The field effect electron emitter as claimed in claim 3, wherein a segment, of the number of segments, is an L-shaped segment, and wherein limbs of the L-shaped segment adjoin two sides of another segment of the number of segments.

19. The field effect electron emitter as claimed in claim 3, wherein exactly one switching apparatus is assigned to each segment of the number of segments.

* * * * *